United States Patent Office 3,385,808
Patented May 28, 1968

3,385,808
DRY PIGMENT COMPOSITIONS OF
DYEING PLASTICS
Wulf von Bonin, Leverkusen, Jürgen Koerner, Opladen, Reinhold Hörnle, Cologne-Flittard, and Karlheinz Wolf, Cologne-Stammheim, Germany, assignors to Farbenfabriken Bayer Aktiengesellschaft, Leverkusen, Germany, a German corporation
No Drawing. Filed Oct. 27, 1964, Ser. No. 406,927
Claims priority, application Germany, Nov. 14, 1963, F 41,278
18 Claims. (Cl. 260—17)

ABSTRACT OF THE DISCLOSURE

Free flowing, non-aqueous, finely divided combinations for coloring plastics are disclosed which are composed of 10–80% by weight of a pigment and 90–20% by weight of a graft polymer prepared by radical polymerization of a polymerizable vinyl compound and a polyalkylene oxide having a molecular weight of about 1000 to 2000 and a formaldehyde-polyalkylene glycol acetal having a molecular weight of about 800 to 4000.

The above combinations are eminently suitable for dyeing synthetic materials and result in the preparation of such dyed materials of substantially uniform speck-free color.

This invention relates to a dry pigment composition containing a pigment and a graft polymer in a finely divided state, said dry pigment composition being used for drying synthetic materials (plastics). Furthermore, this dry pigment composition may contain a plasticizer having a melting point above +50° C.

The pigments employed for dyeing synthetic materials are frequently only poorly and insufficiently dispersible in synthetic materials and lacquers because of their often hard texture. In such cases the synthetic material pieces show non-uniform dyeings, mottling and streakiness when worked up by usual methods on rolls or in the extruder. Examples of pigments with a hard texture are phthalocyanines and anthraquinone pigments, quinacridones and some azo pigments.

Various methods have become known which were devised to overcome these disadvantages. Thus it has already been proposed to form pastes of pigments by friturating them with plasticizers on a triple roll apparatus. In this way a finer dispersion is achieved; the materials colored therewith generally show a level speck-free dyeing.

Because they are sometimes inconvenient to handle, pigment pastes do not always find acceptance in practice. Other substances have therefore been explored with the help of which also pigments powders may be well dispersed. Natural resins and also synthetic resins have been proposed for this purpose, e.g. resin esters or copolymers of vinyl chloride and vinyl acetate or polypropylene. Such pigment preparations are indeed readily dispersible in some synthetic materials, but are only poorly tolerated by others. The insufficient tolerance of known pigment pastes by some synthetic materials becomes manifest, for example, in that the strength values of such synthetic materials are reduced. The range of application of known pigment preparations is thus substantially restricted.

Plasticizers having melting points of over 50° C., which are compatible with a large number of synthetic materials, have also been already proposed for the production of dry pigment preparations. For the use of such pigment preparations in tropical regions, however, the melting point of such plasticizers still proves too low. Furthermore the plasticizers used in the known preparations can extrude from several synthetic materials, especially from polyolefins.

It has now been found that, surprisingly, mixtures of pigments and graft polymerizates of polymerizable vinyl compounds on polyalkylene oxides and/or formaldehyde-polyalkylene glycol polyacetals are eminently suitable as dry and millable preparations for the dyeing of synthetic materials. These preparations are easily dispersible in a variety of media, which are to be considered for the production of synthetic materials. Because of their good compatibility with numerous syntheic resins or synthetic materials, such formulations are almost universally applicable.

The compositions can moreover contain, within certain limits, the usual plasticizers, preferably those which are solid at room temperature. In general the kneadability of the pigment preparations with the abovementioned graft polymerizates is improved in this way.

As plasticizers may be used the esters of phthalic acid for example dicyclohexylphthalate, condensation products of phthalic acid and trimethylol propane, esters of phosphorus acids for instance triphenylphosphate, diphenyloctylphosphate, mono-, di- or tri-chlorotriphenylphosphate and other useful plasticizers.

The new pigment preparations preferably contain 10 to 80% of a pigment, 80 to 10%, especially 60 to 30%, of one of the said graft polymers and 0 to 30% of a plasticizer. The preparations are in general produced by thoroughly mixing or kneading the graft polymerizate with the pigment and optionally with a suitable plasticizer in a suitable milling, stirring or kneading apparatus, to obtain a fine-grained powder.

The graft polymerizates contained in the pigment preparations are produced by grafting polymerizable vinyl compounds on polyalkylene oxides and/or formaldehyde-polyalkylene glycol polyacetals. Suitable methods are radical polymerization of vinyl compounds in the presence of the grafting basis either with or without a solvent or by emulsion- or solution-polymerization. Processes for the production of the graft polymerizates on the basis of polyacetals are described for example in French Patent No. 1,358,044.

The polyalkylene oxides to be employed as the grafting basis may be obtained in known manner by polymerization of ethylene oxide or propylene oxide or by polymerization of mixtures of alkylene oxides, e.g. of ethylene oxide, propylene oxide, butylene oxide, etc. Of the series of polyalkylene oxides, water-soluble polyalkylene oxides having molecular weights over 220, especially with molecular weights of 1000 to 5000, are preferred as grafting basis.

Formaldehyde-polyalkylene oxide polyacetals which can likewise be used as grafting basis, are obtained by condensation of formaldehyde with di- or tri-alkylene glycols. Polyacetals with molecular weights of over 200, especially from 800 to 4000, are preferred.

Various polymerizable vinyl compounds can be grafted on the above-mentioned grafting basis, e.g. olefins, such as ethylene, butadiene, or unsaturated carboxylic acids, e.g. acrylic acid, methacrylic acid or their derivatives such as acrylonitrile, acrylamide or methaocrylamide, as well as acrylates and methacrylates, for example methyl methacrylate, dodecyl methacrylate, ethyl acrylate or butyl acrylate. Vinyl esters of lower fatty acids are also suitable, such as vinyl acetate, vinyl propionate, or vinyl halides such as vinyl chloride or vinylidene chloride, and vinyl aromatics such as styrene or methyl styrene.

A class of especially well suited graft polymerizates is obtained by grafting styrene or vinyl chloride or vinyl acetate or methyl methacrylate.

The pigment preparations can contain as coloring media organic pigments, e.g. pigment dyestuffs of the azo series (see Ullmanns Enzyklopädie der technischen Chemie, vol. 13, p. 806 (1962)), complex pigment dyestuffs (see Ullmanns Enzyklopädie der technischen Chemie, vol. 13, p. 809), dye lacquers (see Ullmanns Enzyklopädie der technischen Chemie, vol. 13, p. 808) and anthraquinone pigment dyestuffs, quinacridone, dioxazine, thioindigo pigments as well as inorganic pigments, e.g. iron, cadmium, chromium, titanium and zinc pigments, and carbon black.

For the production of the pigment preparations, the pigments can either be used as dry powders or in the form of pigment pastes, in the latter case drying of the initially moist pigment preparations being an added step.

The new dry pigment preparations are outstandingly suitable, as already mentioned, for the dyeing of various synthetic materials in the mass, as for the dyeing of polyolefins such as polyethylene and polypropylene, polyamide, polyvinyl chloride, polycarbonates, polystyrene, cellulose esters and ethers, polyacetals and synthetic materials of polyesters. Dyeings are obtained which are distinguished by good transparency and good fastness properties. The synthetic materials are dyed in the mass in the usual manner by pre-mixing the synthetic material and the pigment in suitable devices, followed by plasticizing and homogenizing in usual manner, e.g. on hot rolls or in extruders. End products such as foils, tubes and strands can thus be obtained directly, or the material, after granulation, can be further worked up into end products by one of the known processes. The synthetic materials can also be dyed in known manner on the surface.

The following examples are given for the puruspose of illustrating the invention.

Example 1

20 grams of the graft polymerizate A described below and 17.5 g. dicyclohexyl phthalate are dissolved hot in 125 ml. dioxane. This solution is added while stirring with an Ultra-Turrax high speed stirrer, to an aqueous pigment suspension which has been produced from 82 g. of a 29% filter cake of a copper phthalocyanine of the α-modification and about 250 ml. water. The mixture thus obtained is milled for 24 hours in a steel ball mill, then filtered and the residue dried at 50° C. A pigment preparation is thus obtained, with which polyethylene and polyvinyl chloride can be dyed in the mass level and without specks.

Example 2

150 grams lin-p-N,N'-quinacridone are kneaded in a heatable kneader at 80 to 100° C. for one hour with 105 g. of the graft polymerizate A described in more detail below and 45 g. triphenyl phosphate. After cooling the pigment preparation is finely ground. A product is obtained with which polyvinyl chloride, polystyrene and polyethylene can be dyed in the mass level and free from specks.

Example 3

In a manner analogous to that of Example 2, 150 g. chlorinated copper phthalocyanine are kneaded with 150 g. of the graft polymerizate B described below at 80 to 100° C. for one hour. A pigment preparation is obtained, with which polystyrene, polyvinyl chloride and polyethylene can be dyed in the mass level and free from specks.

Example 4

150 grams rutile $TiO_2$ are kneaded as in Example 2 with 150 g. of the graft polymerizate D described below at 80 to 100° C. for one hour. A pigment preparation is obtained with which polystyrene and polyvinyl chloride can be dyed in the mass level and free from specks.

Example 5

In a manner analogous to that of Example 2, 150 g. carbon black are kneaded with 150 g. of the graft polymerizate C described below at 80 to 100° C. for one hour. A pigment preparation is obtained, with which polyvinyl chloride and polystyrene can be dyed in the mass level and without specks.

Example 6

In a heatable Werner and Pfleiderer dispersion kneader 45 g. of molten triphenyl phosphate are added at 100–120° C. to 105 g. of the graft polymerizate A described below. The mixture is kneaded for half an hour. Subsequently, 150 g. of a dyestuff as described in Example 19 of U.S. Patent No. 2,944,050 are added with continuous kneading. After 3 hours of kneading at 100 to 120° C., the kneader is cooled to 60 to 80° C. A coarse powder is obtained which is ground after cooling. Polyethylene, polystyrene and polyvinyl chloride can be dyed in the mass with this pigment preparation level and without specks.

Example 7

As in Example 6, 105 g. of the graft polymerizate A described below, 45 g. triphenyl phosphate and 150 g. of a Ba-lacquer of an azodyestuff of the formula

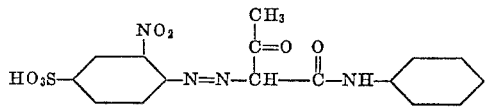

are kneaded for 3 hours at 100 to 120° C. A pigment preparation is obtained, with which polyethylene, polystyrene and polyvinyl chloride can be dyed in the mass level and free from specks.

Example 8

An aqueous pigment-graft polymerizate suspension, which consists of 150 g. 35.4% filter cakes of a copper phthalocyanine of the α-modification, 53.1 g. of the graft polymerizate A described below and about 180 ml. water, is ground in a ball mill with stirrer at 1010 r.p.m. for 28 minutes and then filtered. The residue is dried at 50° C. and pulverized. A powder is obtained, with which polyvinyl chloride, polystyrene and polyethylene can be dyed in the mass level and without specks.

Example 9

In a two-shaft kneader blade screw extruder according to German patent specification No. 813,154, a mixture is kneaded which consists of 50 g. copper phthalocyanine of the β-modification, 35 g. of the graft polymerizate A described below and 15 g. triphenyl phosphate. After cooling and grinding, a powder is obtained with which polyethylene and polyvinyl chloride can be dyed in the mass level and without specks.

*Graft Polymerizate A*, obtained by polymerization of 80 parts of a 0.9% solution of benzoyl peroxide in styrene in the presence of 50 parts polyethylene oxide having a molecular weight of about 1550 at 150° C. The resultant reaction product is ground after cooling and can be employed without further purification.

*Graft Polymerizate AA*, obtained as methanol-insoluble residue by washing out the graft polymerizate A with boiling methanol.

*Graft Polymerizate B*, obtained by polymerization of a solution of 0.1 part benzoyl peroxide and 0.4 part dicumyl peroxide in 50 parts methyl methacrylate at 140° C. in the presence of 50 parts polyethylene oxide of molecular weight 4000. The unpurified ground reaction product can be employed directly.

*Graft Polymerizate C*, obtained by polymerization of 1000 parts of vinyl chloride in an aqueous phase consisting of 1000 parts water, 1000 parts polyethylene oxide of molecular weight 1550 and 20 parts parraffin sulphonate, 10 parts concentrated aqueous ammonia solution and 10 parts ammonium persulphate at 45° C. The reaction mixture is either centrifuged off and dried, or treated with an equal amount of methanol and then filtered off and dried.

*Graft Polymerizate D,* obtained like graft polymerizate A, except that, instead of polyethylene oxide, a polyacetal from diethylene glycol and formaldehyde is used, having an OH value of 103.

*Graft Polymerizate E,* obtained like graft polymerizate B except that, instead of polyethylene oxide, a polyacetal from formaldehyde and triethylene glycol is used, having an OH value of 68.

*Graft Polymerizate F,* obtained like graft polymerizate B, except that, instead of polyethylene oxide, a polyacetal from formaldehyde and diethylene glycol is used, having an OH value of 111.

Graft polymerizates of this list, which are not mentioned in the preceding examples, can be used instead of the graft polymerizates which are indicated in the examples.

What we claim is:

1. Free-flowing, non-aqueous, finely divided combination for coloring plastics comprising a mixture of 10–80% by weight of a pigment and 90–20% by weight of a graft polymer obtained by radical polymerization of a polymerizable vinyl compound onto a polyalkylene oxide compound selected from the group consisting of a polyalkylene oxide having a molecular weight of about 1000 to 2000 and a formaldehyde-polyalkylene glycol acetal having a molecular weight of about 800 to 4000 wherein the weight ratio of vinyl compound to polyalkylene oxide compound is from 1 to 1.6.

2. Free-flowing, non-aqueous, finely divided combination for coloring plastics according to claim 1 wherein said polyalkylene oxide is polyethylene oxide.

3. Free-flowing, non-aqueous, finely divided combination for coloring plastics according to claim 1 wherein said formaldehyde-polyalkylene glycol acetal is formaldehyde-polyethylene glycol acetal having a hydroxyl value of about 100.

4. Free-flowing, non-aqueous, finely divided combination for coloring plastics according to claim 1 wherein said polymerizable vinyl compound is styrene.

5. Free-flowing, non-aqueous, finely divided combination for coloring plastics according to claim 1 wherein said polymerizable vinyl compound is vinyl chloride.

6. Free-flowing, non-aqueous, finely divided combination for coloring plastics according to claim 1 wherein said polymerizable vinyl compound is methyl methacrylate.

7. Free-flowing, non-aqueous, finely divided combination for coloring plastics according to claim 1 additionally containing a plasticizer having a melting point above +50° C.

8. Free-flowing, non-aqueous, finely divided combination for coloring plastics according to claim 7 wherein said plasticizer is triphenyl phosphate.

9. Free-flowing, non-aqueous, finely divided combination for coloring plastics according to claim 1 wherein said graft polymer is obtained by the polymerization of styrene in the presence of polyethylene oxide and said pigment is copper phthalocyanine.

10. Free-flowing, non-aqueous, finely divided combination for coloring plastics according to claim 1 wherein said graft polymer is obtained by the polymerization of styrene in the presence of polyethylene oxide and said pigment is lin-p-N,N'-quinacridone.

11. Free-flowing, non-aqueous, finely divided combination for coloring plastics according to claim 1 wherein said graft polymer is obtained by the polymerization of methyl methacrylate in the presence of polyethylene oxide and said pigment is chlorinated copper phthalocyanine.

12. Free-flowing, non-aqueous, finely divided combination for coloring plastics according to claim 1 wherein said graft polymer is obtained by the polymerization of styrene in the presence of a polyacetate of polyethylene glycol and formaldehyde having an OH value of 103 and said pigment is rutile $TiO_2$.

13. Free-flowing, non-aqueous, finely divided combination for coloring plastics according to claim 1 wherein said graft polymer is obtained by the polymerization of vinylchloride in the presence of polyethylene oxide and said pigment is carbon black.

14. Free-flowing, non-aqueous, finely divided combination for coloring plastics according to claim 1 wherein said graft polymer is obtained by the polymerization of styrene in the presence of polyethylene oxide and said pigment is

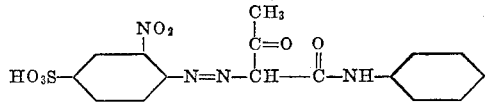

15. Free-flowing, non-aqueous, finely divided combination for coloring plastics according to claim 1 wherein said graft polymer is obtained by the polymerization of styrene in the presence of polyethylene oxide and said pigment is α-modified copper phthalocyanine.

16. Free-flowing, non-aqueous, finely divided combination for coloring plastics according to claim 1 wherein said graft polymer is obtained by the polymerization of styrene in the presence of polyethylene oxide and said pigment is β-modified copper phthalocyanine.

17. Process for dyeing plastics comprising intimately contacting a plastic material with a free-flowing, non-aqueous, finely divided combination according to claim 1.

18. A plastic selected from the group consisting of polyolefins, polyamides, polyvinyl chloride, polycarbonates, polystyrene, cellulose ethers, cellulose esters and polyacetals, dyed in the mass with the free-flowing, non-aqueous, finely divided combination of claim 1.

References Cited

UNITED STATES PATENTS

| | | | |
|---|---|---|---|
| 3,004,858 | 10/1961 | Sheehan et al. | 106—308 |
| 3,050,511 | 8/1962 | Szwarc | 260—874 |
| 3,156,574 | 11/1964 | Gomm et al. | 106—308 |

FOREIGN PATENTS

| | | |
|---|---|---|
| 922,457 | 4/1963 | Great Britain. |
| 978,752 | 12/1964 | Great Britain. |

MORRIS LIEBMAN, *Primary Examiner.*

J. E. CALLAGHAN, *Assistant Examiner.*